United States Patent [19]

Sandbank et al.

[11] Patent Number: 5,053,857
[45] Date of Patent: Oct. 1, 1991

[54] TELEVISION SIGNALS

[75] Inventors: Charles P. Sandbank, Reigate; Richard Storey, Lingfield; Martin Weston, Banstead, all of United Kingdom

[73] Assignee: British Broadcasting Corporation, London, England

[21] Appl. No.: 387,022

[22] Filed: Jul. 28, 1989

[30] Foreign Application Priority Data

Jul. 28, 1988 [GB] United Kingdom ............... 8817979

[51] Int. Cl.$^5$ .............................................. H04N 11/02
[52] U.S. Cl. ...................................... 358/12; 358/133; 358/141
[58] Field of Search ........................... 358/12, 141, 133

[56] References Cited

U.S. PATENT DOCUMENTS

| 4,873,573 | 10/1989 | Thomas | 358/133 |
|---|---|---|---|
| 4,884,138 | 11/1989 | Storey | 358/133 |
| 4,931,855 | 6/1990 | Salvadorini | 358/12 |
| 4,942,466 | 7/1990 | Sandbank | 358/133 |

FOREIGN PATENT DOCUMENTS

| 705770 | 9/1987 | Int'l Pat. Institute . |
| 2194409A | 3/1988 | United Kingdom . |
| 2213342A | 9/1989 | United Kingdom . |

OTHER PUBLICATIONS

N.T.I.S. Tech. Notes, Oct. 1987, p. 951, Springfield, VA., U.S.; R. H. Marchman: "Reducing Color/Brightness Interaction In Color Television".
I.E.E.E. Transactions on Consumer Electronics, vol. CE-33, No. 1, Feb. 1987, IEEE, New York, N.Y., U.S.; R.J. Iredale: "A Proposal for a New High-Definition NTSC Broadcast Protocol".
SMPTE Jounal, vol. 96, No. 8, Aug. 1987, White Plans, N.Y., U.S.; William F. Schreiber: "Improved Television Systems: NTSC and Beyond".
BBC Research Department Report Number BBC RD 1986/5, Jun. 1986, R. Storey, HDTV Motion Adaptive Bandwidth Reduction Using Datv.
BBC Research Department Report Number BBC RD 1975/36, Dec. 1975, J. O. Drewery, The Filtering of Luminance and Chrominance Signals to Avoid Cross--Colour in a Pal Colour System.
I-Pal: a Compatible Variant of PAL, Free of Cross Effects and with Enhanced Horizontal Definition in the Luminance, G. Holoch, P. Janker and N. Mayer, No. 209, Feb. 1985.
IEEE Transactions on Communications, vol. Com. 32, No. 8, Aug. 1984 Extended Definition IV Fully Compatible With Existing Standards, Takahiko Fukinuki and Yasuhiro Hirano.

Primary Examiner—Howard W. Britton
Attorney, Agent, or Firm—Robert F. O'Connell

[57] ABSTRACT

In order to achieve increased resolution and to minimise cross-colour and cross-luminance effects in a PAL, NTSC or SECAM encoded signal, a high definition source (20) is pre-filtered at a higher line rate according to one of at least two methods (22, 24, 26). The filtered signal is sub-sampled (at 30, 32) at the source line standard where necessary, depending upon the degree of bandwidth reduction employed and one of the methods of pre-filtering and sub-sampling selected according (at 34) to a control signal (36) dependent on picture content. The luminance and chrominance components of the selected encoded signal are band pass filtered (46, 50, 52) and the chrominance signal modulated onto a sub-carrier (54) such that the frequency spectrum of the luminance and chrominance signals do not overlap.

31 Claims, 4 Drawing Sheets

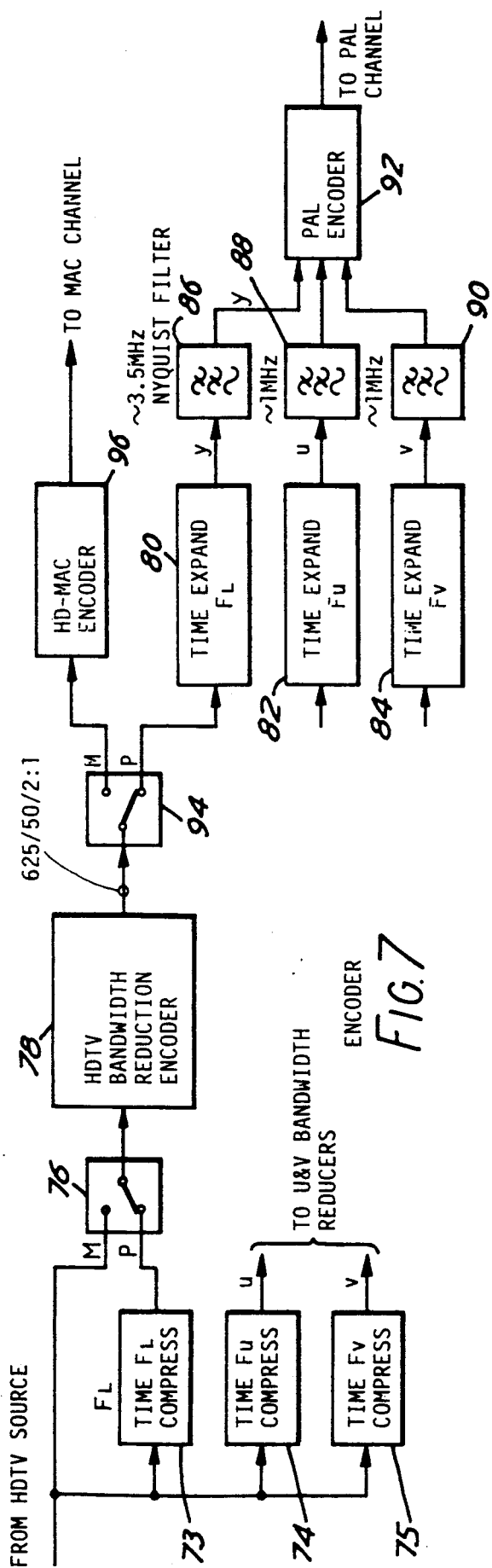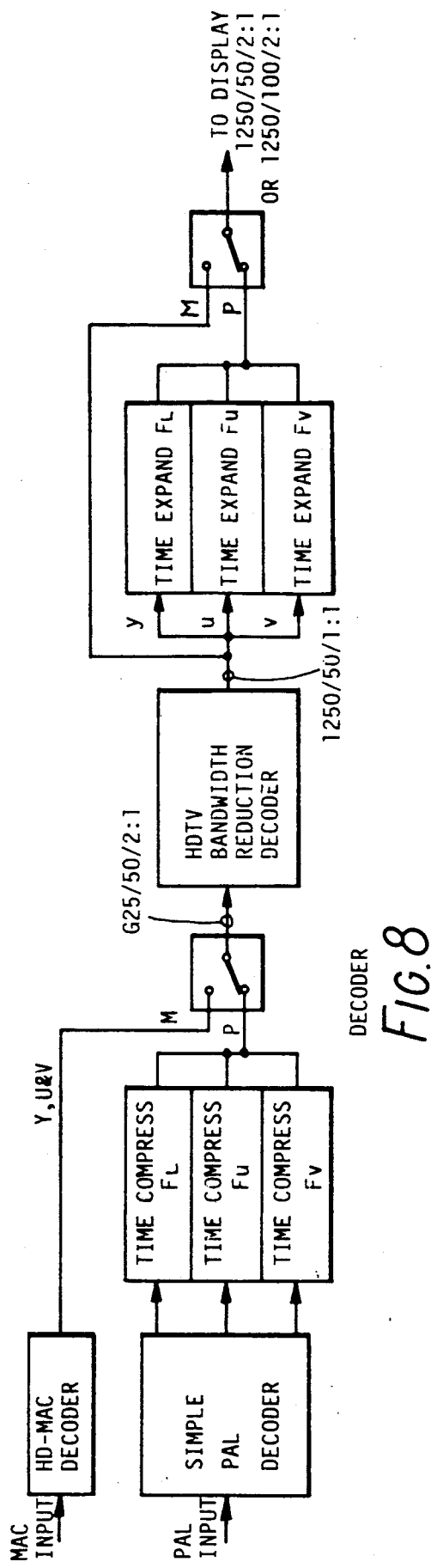

TELEVISION SIGNALS

This invention relates to broadcast television signals and to a method and apparatus for encoding and decoding such signals. In particular the invention is concerned with the transmission of high definition (HDTV) sources via conventional bandshared channels, for example PAL, NTSC and SECAM. The invention makes use of spectrum folding techniques to achieve bandwidth reduction. By spectrum folding we mean the technique pre-filtering a signal by one of two or more methods depending on picture content to limit the information content of the signal, subsequent sub-sampling of the signal limited by each method and selection of one of the so compressed signals. Usually, where the signal source is a high definition source, the pre-filtering is applied to a signal at a high definition line standard, for example 1250 lines per frame, which is collapsed to a signal at transmission line rate standard, by sub-sampling alone or by sub-sampling followed by sample re-positioning according to the chosen method of bandwidth reduction.

There have been several systems proposed for transmitting wide bandwidth HDTV signals through a restricted bandwidth channel such as the channels used at present for commercial broadcasting. The particular methods are described in BBC Research Department Report No. BBC RD 1986/5 entitled 'HDTV Motion Adaptive Bandwidth Reduction Using DATV' by R. Storey, and our U.S. Pat. No. 4,873,573 entitled 'Video Signal Processing for Bandwidth Reduction'. Both these documents describe methods of bandwidth reduction which involve two or three dimensional pre-filtering of an HDTV signal followed by sub-sampling to achieve a signal for transmission which has a bandwidth of approximately one quarter of that of the original HDTV signal. Both of the methods result in a folding of the signal spectrum into a smaller spectral volume for transmission, for example, by using a quincunxial sampling pattern. This spectrum must be unfolded at the receiver, by interpolation, to restore the desired signal frequency components and thus the resolution of the transmitted pictures. Both methods rely on DATV (Digitally Assisted Television) in which a digital assistance channel is used to carry information about the coding decisions which have been taken in order that the decoder in the receiver can decode the signal correctly. The methods use complex, high performance encoders but simple, cheap decoders which only need to respond to the digital assistance information to switch between different decoding techniques.

BBC Research Department Report 1986/5 mentioned above describes a system in which two or more different types of pre-filtering are used to take account of different types of picture information, for example a temporal pre-filter is used for stationary finely detailed areas whereas a spatial pre-filter is used for rapidly moving but poorly detailed areas. A slightly larger spatial filter may be used for intermediate levels of detail moving at a medium speed. Theoretically any number of pre-filters could be used, each one being assigned to a particular picture content. However, in practice only a limited number are used, for example, three.

U.S. Pat. No. 4,873,573 describes an extension to the techniques of BBC RD 1986/5 in which motion compensation is used to facilitate transmission of an image that is both highly detailed and rapidly moving.

The bandwidth reduced luminance and chrominance signals resulting from these techniques can be packaged in such a way as to make them fit into the format of a conventional 625 line MAC (Multiplexed Analogue Components) signal; this combination has been termed HD-MAC. A suitable packaging technique is described in our U.K. patent application no. 2194409 entitled 'Compatible Transmission of HDTV Through a 625 Line Channel'. The MAC signal uses time division multiplexing of both the luminance and chrominance components; that is, they are separated in time. A single line of MAC comprises a time compressed line of luminance followed by one of two time compressed chrominance components. The next line comprises the next line of time compressed luminance followed by the other of the two time compressed chrominance components. In HD-MAC the time compressed luminance and chrominance components are replaced by components which are both bandwidth reduced and time compressed. This packaging technique has the advantage that it has MAC compatibility; that is when the HD-MAC signal is decoded by a conventional MAC decoder rather than one capable of correctly unfolding the bandwidth reduced signal, it will produce a picture of reasonable quality.

A second enhanced definition approach is described in the following papers:

Holoch. P., Janker. P., Mayer. N. 1985. I-PAL: a compatible variant of PAL, free of cross effects and with enhanced horizontal definition in the luminance. EBU Review No. 209. February 1985. pp 7-14, and Fukinuki. T., 1984. Hirano. Y. Extended Definition TV Fully Compatible with Existing Standards. IEEE Transactions on Communications, Vol Com-33, No. 8 August 1984. pp 948-953.

These papers describe methods which are aimed primarily at increasing the amount of detail transmissible through a conventional NTSC or PAL transmission channel, and which use frequency interleaving techniques. Areas of the three dimensional transmission spectrum are reserved or created for auxiliary 'helper' signals which carry additional signal information. The decoder retrieves these signals and restores them to a form suitable for adding to the conventionally decoded baseband signal. These techniques require a more rigorous separation of the signal's frequency components than would normally be required, in order to reduce interference between the helper signals and normal luminance and chrominance. The improved separation can itself contribute to an improvement in picture quality over and above the improvement gained from the helper signals. The improvement gained from these techniques is not as great as those gained from the spectrum folding techniques referred to previously. However, they do have the advantage that the decoder that is required is simpler and, consequently, a receiver incorporating the decoder will be cheaper.

The invention aims to apply spectrum folding bandwidth reduction techniques to the encoding of conventional bandshared signals such as PAL, NTSC and SECAM in a way that is compatible with such signals when conventionally encoded.

The invention is defined by the accompanying independent claims to which reference should be made.

The invention in its various aspects has the advantage that it enables a picture resolution to be obtained which is mid-way between HDTV and enhanced definition television. Furthermore, it enables cross colour and cross-luminance effects which are inherent in shared band systems such as PAL, NTSC and SECAM to be minimised.

Preferred embodiments of the invention will now be described, by way of example only, and with reference to the accompanying drawings, in which:

FIG. 7 Shows an encoder of a second embodiment of the invention; and

FIG. 8 Shows a decoder for use in conjunction with the encoder of FIG. 7.

Throughout the description reference will be made to a PAL encoded television system. However, it is to be understood that the invention is not limited to PAL and is equally applicable to other encoding systems such as NTSC, SECAM or any other similarly encoded television systems.

Figure 1:
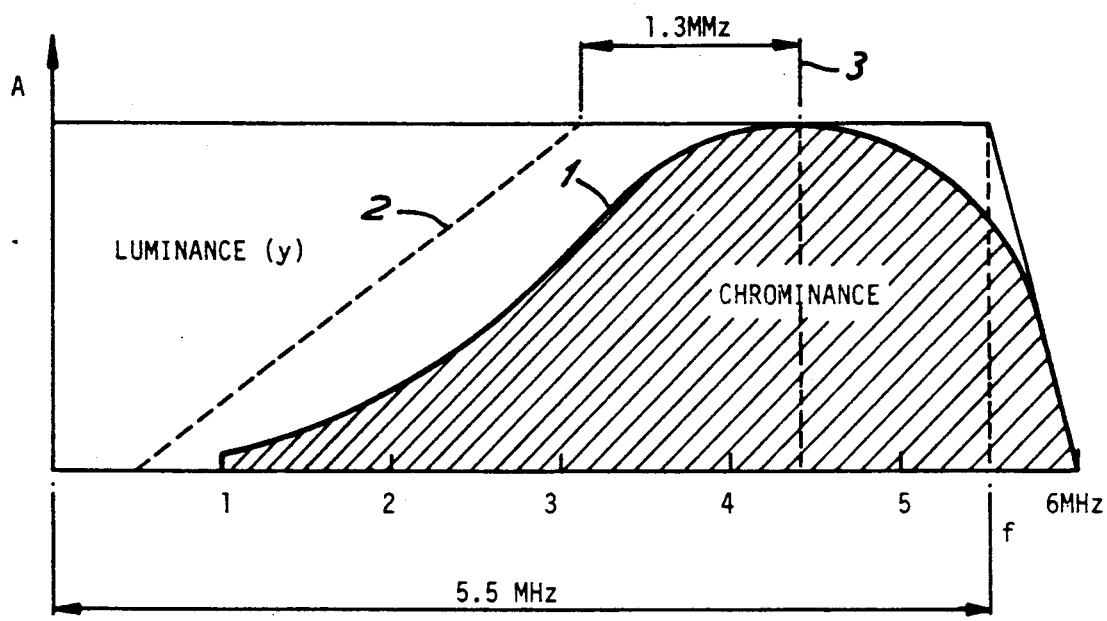
FIG. 1 Shows the spectrum of a conventional PAL encoded signal.

FIG. 1 shows the spectra of luminance and chrominance transmitted by the PAL system illustrated as a plot of amplitude against frequency. The shaded portion 1 represents the probable limit of the chrominance component whereas the broken line 2 represents the limit of chrominance specified by the PAL standard broken line 3 shows the 4.43 MHz colour subcarrier. The luminance spectrum Y is normally assumed to extend up to the limit of the transmission channel bandwidth and to comprise frequency components grouped around multiples of the line frequency $f_L$. In the PAL system the two chrominance components, U and V are frequency shifted by $\frac{1}{4} f_L$ and $\frac{3}{4} f_L$ respectively, by a suitable choice of colour sub-carrier frequency to interleave them with the luminance components. In practice, these assumptions are only true for picture content having little detail in the vertical direction; that is, a picture containing a predominance of vertical lines.

Figure 2:
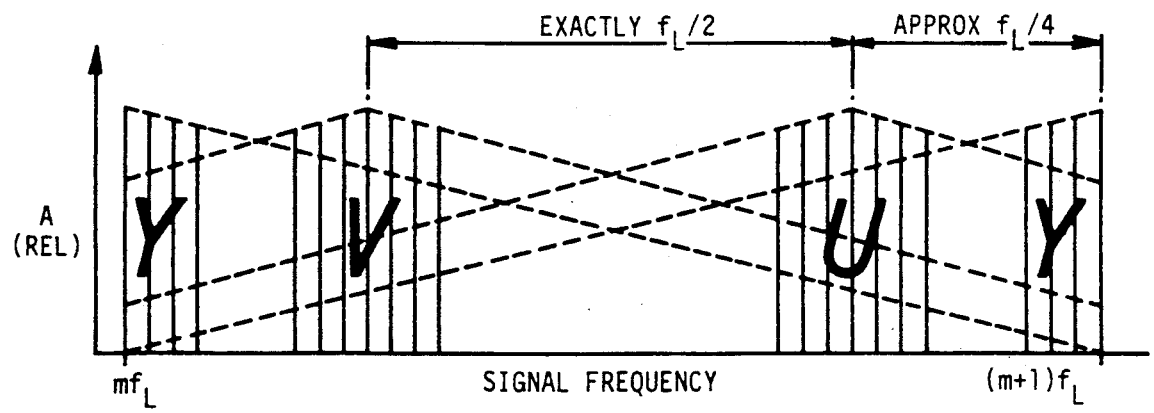
FIG. 2 Shows a typical region of the spectrum of FIG. 1 near the chrominance sub-carrier frequency.

FIG. 2 shows a more true to life representation of the frequency distribution of the Y, U and V components. Each component has a continuous distribution with a peak in relative amplitude for the luminance component of $mf_L$ where m is an integer, and for U and V components at approximately $(m+\frac{1}{4}) f_L$ and $(m+\frac{3}{4}) f_L$. The separation between the peak U and V components is maintained at exactly $f_L/2$.

As can be appreciated from FIG. 2, there is no rigorous partitioning of the Y, U and V components and there is considerable overlap. It is thus possible for the PAL decoder to confuse the three components. Such confusion gives rise to cross-colour and cross-luminance effects. Cross-colour appears as spurious colour in highly detailed areas as the decoder mistakes high frequency luminance for chrominance information. Cross-luminance appears as dot patterns when coloured areas are mistaken for fine (high frequency) detail.

In practice, cross-luminance is usually suppressed at the PAL decoder by notch filtering of the luminance before display. This removes most of the chrominance information that would normally cause cross-luminance, but it also removes luminance components above approximately 4 MHz, making the displayed picture less detailed than it could be. More sophisticated techniques have been proposed to achieve a better separation of Y, U and V. One such technique is described in BBC Research Department Report No. BBC RD 1975/36 entitled 'The Filtering of Luminance and Chrominance Signals to Avoid Cross-Colour in a PAL System'. Such techniques generally produce a better separation of the three components, although a cross-effect extension of one component is sometimes only obtained at the expense of the other two components. Extended or enhanced PAL and NTSC as described in the Holoch et al and Fukinuki et al. articles referred to previously are further extensions of these techniques in which spectral volume made free by more complex filtering of Y, U and V components is filled with helper signals.

Figure 3:
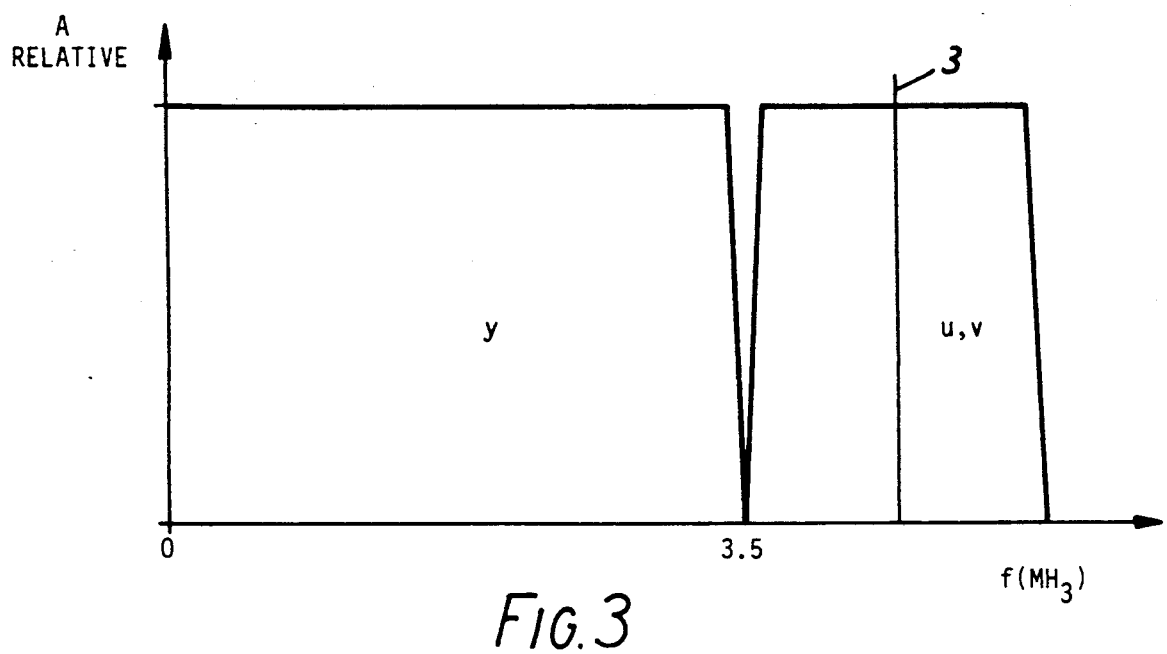
FIG. 3 Shows how luminance and chrominance components may be separated into discrete frequency bands.

In the system of the present invention, the luminance and chrominance components are separated into two discrete frequency bands in the simplest possible way. The luminance component is limited by using a 3.5 MHz low pass filter and the chrominance components are separated by filtering with a band pass filter as shown in FIG. 3. In such a system there is no possiblity of confusion between the luminance and chrominance components. In practice the components may all be separated before encoding using low pass filters and the chrominance components modulated onto the colour sub-carrier to achieve the desired separation. This technique will be described in more detail in due course.

We have appreciated that the problems associated with limiting the bandwidth of the luminance and chrominance components, for example, loss of detail, may be obviated by applying the spectrum folding bandwidth reduction techniques described previously to both luminance and chrominance components. This technique allows higher luminance and chrominance resolutions to be transmitted through a normal PAL transmission channel. The high definition PAL signals obtained by this system are hereinafter referred to as HD-PAL and are compatible with conventional PAL in that they will produce a picture of reasonable quality when decoded by a conventional PAL decoder.

Figure 4:
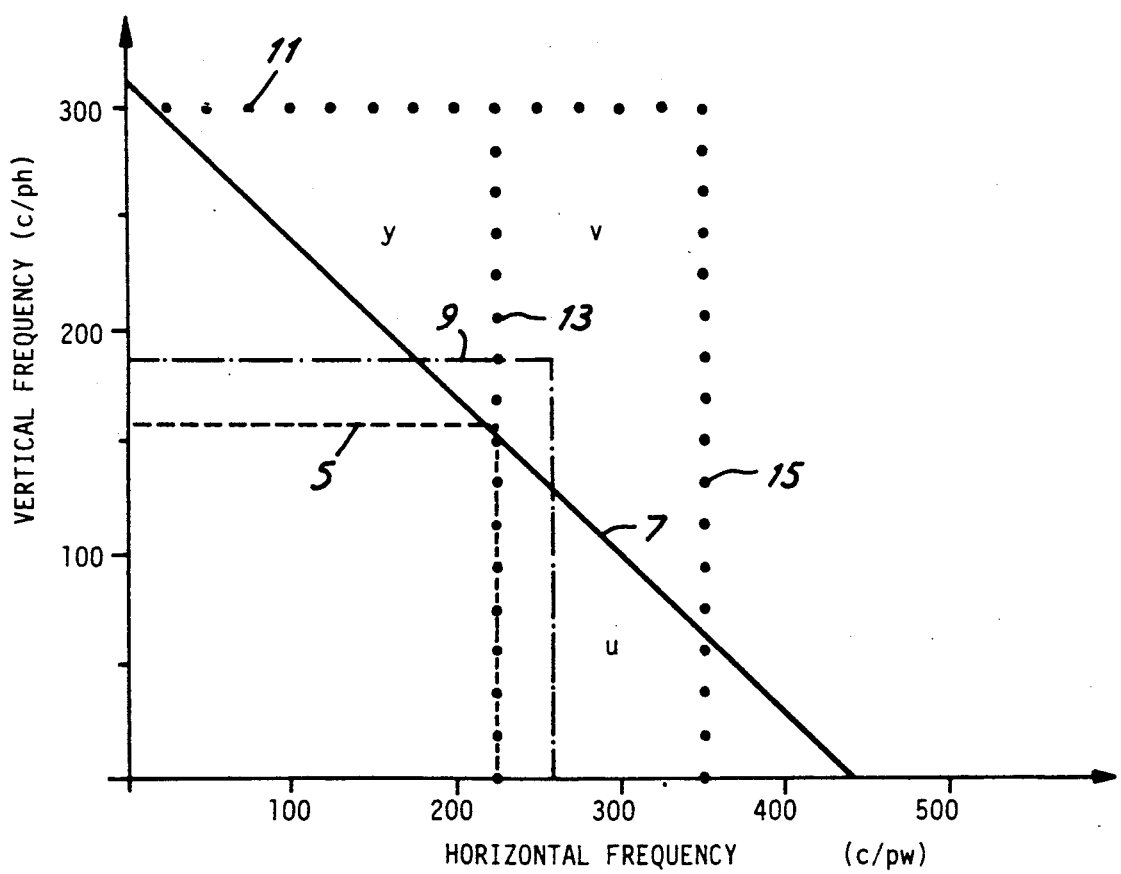
FIG. 4 Shows the limits of resolution of a first embodiment of the invention.
Figure 5:
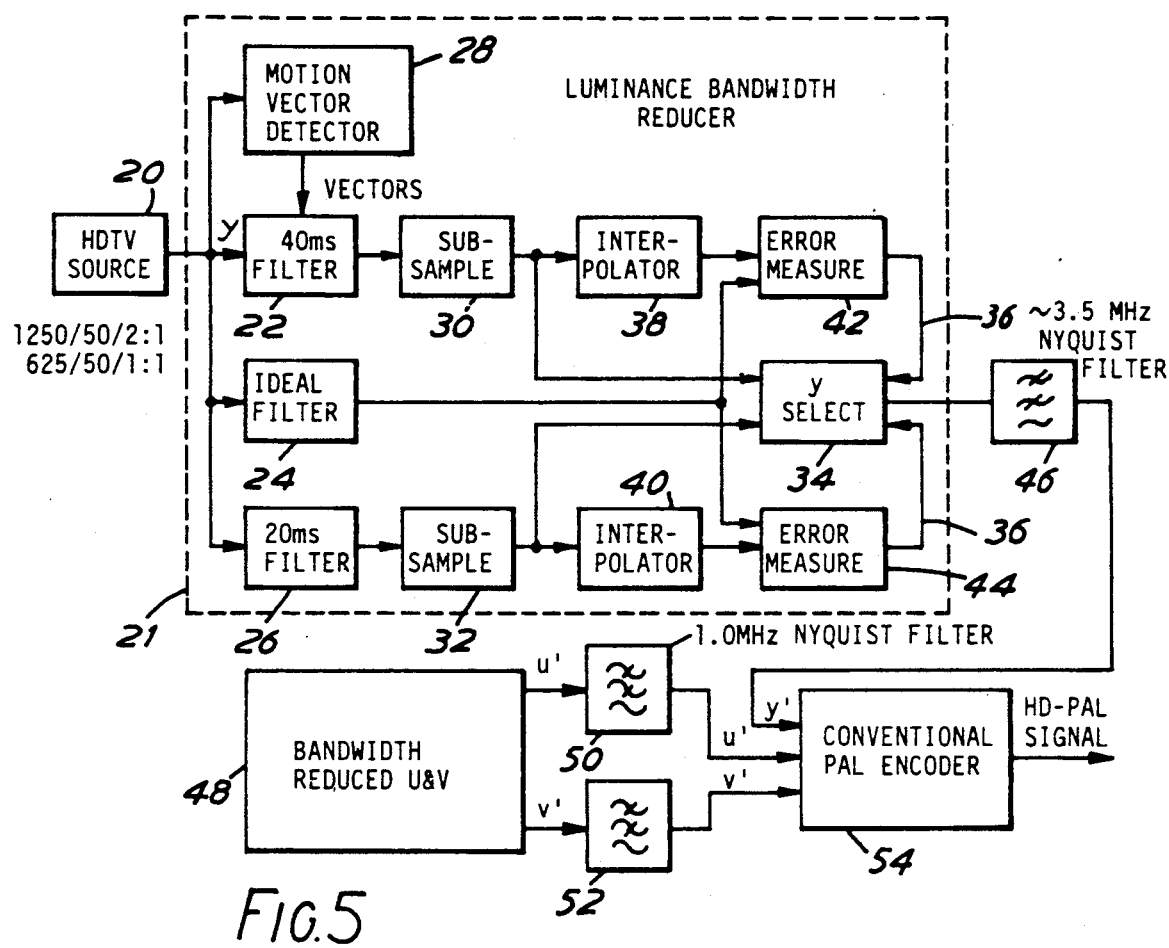
FIG. 5 Shows an encoder of a first embodiment of the invention.
Figure 6:
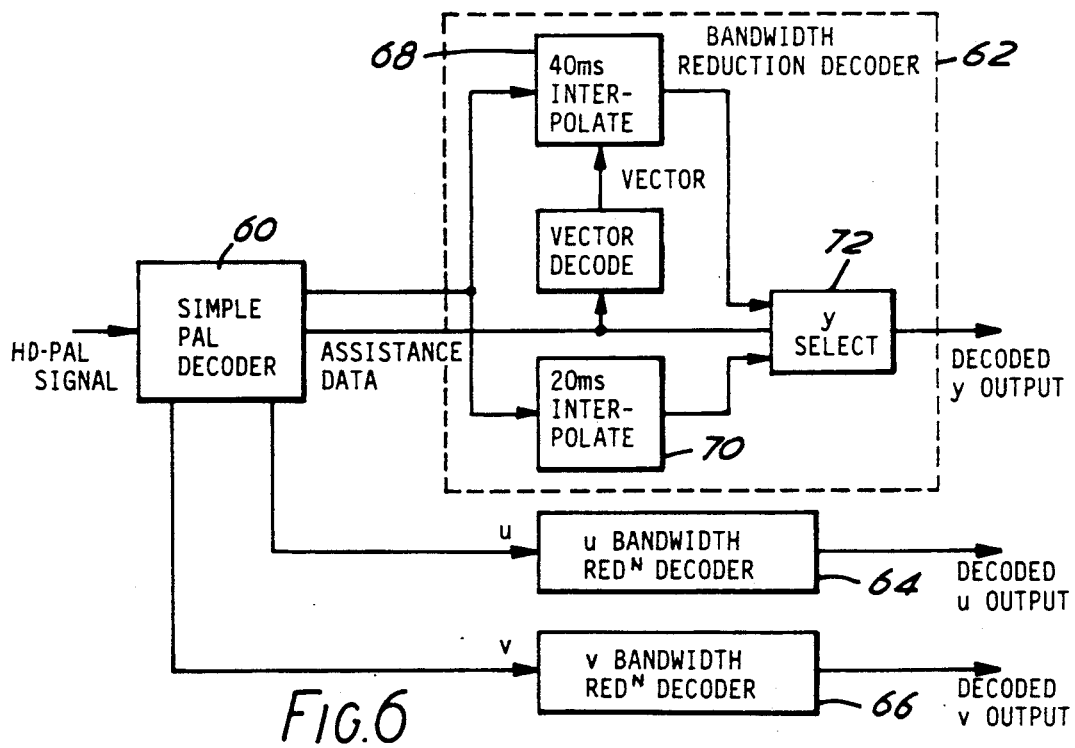
FIG. 6 Shows a decoder for use in conjunction with the encoder of FIG. 5.

As the forms of pre-filtering and interpolation which are to be performed on the high definition signal are dependent on the specific application, two separate system will be described. The system of FIGS. 4 to 6 is designed solely to improve the current PAL and NTSC systems. The embodiment of FIGS. 7 and 8 both improves the existing PAL and NTSC systems and has a degree of compatibility with future HDTV coding systems such as HD-MAC and MUSE. Further information about the MUSE system may be gained from NHK laboratory note No. 304 entitled 'A Single Channel HDTV Broadcast System, the MUSE' by Y. Ninomiya et al.

If this or any other type of frequency partitioning is applied in a conventional PAL or NTSC encoder, the cut rate of the filters must normally be kept sufficiently low to avoid the appearance of 'ringing' at the filter output. Ringing is caused by a rapidly changing phase response. As a consequence, the cut off frequencies of the filters have to be reduced to avoid overlap which results in a further loss of high frequency detail. In systems embodying the present invention, however, the separation filters can be as sharp as the instrumentation allows, provided that their frequency response is symmetrical about the folding frequency of the bandwidth reduction systems. A symmetrical filter allows the full passband to be used by cancellation of phase effects between the signal components below the cutoff and those reflected about the cutoff. Thus, the bandwidth of the channel can be exploited fully without incurring any cross-colour or cross-luminance. This type of filter is commonly referred to as a 'Nyquist filter'.

FIGS. 4 to 6 describe an embodiment of the invention which as mentioned, has as its primary aim, transmission of a signal of increased resolution through a conventional PAL transmission channel. As the HD-PAL bandwidth reduction decoder is specific to this application rather than a modified HDTV decoder a two-fold bandwidth reduction only is preferable rather than the usual four-fold reduction used with an HDTV decoder, since it provides symmetrical horizontal and vertical resolutions and gives fewer artifacts in the compatible PAL signal.

Referring to FIG. 4, the luminance coding has two separate paths, a motion compensated 40 msec high resolution path and a 20 msec non-motion compensated path. FIG. 4 is a plot of horizontal frequency against vertical frequency in which broken line 5 shows the spectral limits for the 20 msec non-motion compensated path and, line 7 shows the limit for the 40 msec motion compensated path. Line 9 shows the limit for a conventional PAL. The axes of FIG. 4 have been scaled for equal angular resolution at the viewer's eye and it can be seen that the 40 msec path 7 has matching horizontal and vertical resolutions extending to beyond 400 cycles per picture width and 300 cycles per picture height respectively which corresponds to the 4:3 aspect ratio of a conventional television receiver. The resolution limit of the conventional PAL 9 is restricted horizontally by receiver notch filtering and vertically by camera and display interlace. Notch filtering is only omitted when the display resolution is insufficient to resolve the resulting cross-luminance. It should be noted that the spectral limits of the 20 msec path are very similar to those of conventional PAL. In FIG. 4 the area of the transmission spectrum occupied by the luminance and chrominance signals Y, U and V are shown as the areas bounded by lines 11 and 13, and, 13 and 15 respectively.

We have found that when the motion measurement and assignment techniques described in U.S. Pat. No. 4,873,573 are used, the bandwidth reduction system spends most of its time in the 40 msec mode, lapsing into the 20 msec mode only rarely. The 20 msec mode is only used in areas for which no motion vector can be determined, which might be uncovered background or erratic motion for example. The net effect is a doubling of resolution in the cardinal directions, for all motion speeds that the eye can track, with a fall back to conventional PAL resolution for those types of scene content for which the eye is genuinely uncritical.

The chrominance signals U and V are coded similarly to the luminance signals, with a suitably scaled folding frequency in the range of 1 MHz, before they are modulated by the PAL sub-carrier. The chrominance-to-luminance resolution is divided by the ratio of the two folding frequencies which is approximately 3.5:1.

FIGS. 5 and 6 show how such a system may be realised. FIG. 5 shows, in schematic form, the encoder of this embodiment, and FIG. 6 the decoder.

In FIG. 5, picture information is supplied from HDTV source 20. This source must be capable of resolving the full resolution of the 40 msec. mode and so is chosen to be at either of the formats 1250/50/2:1 (1250 lines per picture, 50 fields per second, 2:1 interlace) or 625/50/1:1 in preference to the conventional PAL 625/50/2:1 source, which is partly responsible for the limit in vertical resolution found with conventional PAL. Bandwidth limitation of the luminance signal Y is performed by the circuitry of bandwidth limiter 21. The high definition scanning standard input signal is first fed to three pre-filters 22, 24 and 26.

The first filter 22 is a 40 msec pre-filter having a vertical/horizontal response as shown by line 7 in FIG. 4. This filter must be motion compensated in order to maintain its spatial frequency response for moving picture detail. This motion compensation removes the need for any further bandwidth restriction along the temporal axis (i.e. cycles per second). The pre-filter 22 is thus a motion compensated three-dimensional filter since it must compensate for displacement between input fields as well as filtering in the horizontal and vertical directions. Motion compensation is achieved through the use of motion vectors supplied from motion vector detector 28. The detector 28 receives as its input the HDTV source and calculates motion vectors for each area of the picture. The operation of the motion vector detector 28 and the assignment of vectors is discussed in detail in U.S. Pat. No. 4,873,573 and no further description will be given here.

The second filter 24 is an 'ideal' filter which filters the source signal to the bandwidth that could be carried by the 40 msec pre-filter 22 in the absence of motion compensation and sub-sampling. The purpose of the filter 24 is to provide a clean reference against which the coding fidelity of the 40 and 20 msec bandwidth reduction can be measured.

The third filter 26 is a 20 msec pre-filter which realises the rectangular pass-band of the 20 msec path 5 shown in FIG. 4. The filter is a two-dimensional, or intra-field filter as it requires the signal from a single field only.

The remaining circuitry is similar to that described in our U.S. Pat. No. 4,942,466 and reference should be made to the specification of that patent for a detailed description. For the purposes of assisting in the understanding of the present invention a summary is given here.

The output line standard of the sub-samplers 30,32 is 625/50/2:1, the same structure as used by the PAL transmission channel, so no further sample re-positioning is required. The input line standard to the preceding pre-filters 22, 24, 26, however, is that of the higher line rate source standard. If this is 625/50/1:1 or 1250/50/1:1 then the pre-filter output line standards will have lines at all of the positions required to form sub-samples at 625/50/2:1. If, however, the source line standard is 1250/50/2:1, then the pre-filter output line standards will have correctly positioned lines on only one of the two television fields required to form a picture. The pre-filters must therefore perform interpolation on every second field to shift their output sample positions to those required for sub-sampling. This is achieved in practice by using a different set of filter coefficients in each of the filters. A suitable sub-sampling structure to be applied by the sub-samplers 30 and 32 is the field quincunx in which each field has an orthogonal sample pattern but one field is offset horizontally by one half horizontal the sample pitch. Thus, when combined, the fields form a quincunx pattern.

The sub-sampled PAL-standard signals output from the sub-samplers 30, 32 form the inputs of a channel selector 34 which selects one of the two signals in accordance with control signals 36 determined for each coding path. The control signals are achieved in principle by restoring the sub-sampled signals to a displayable form in the encoder using interpolators 38, 40. Thus, the encoder has access to the signals that the decoder would generate if it were to use the correct type of interpolator. A subtractor (not shown) in an error measurer 42, 44 subtracts the output signal from the ideal filter 24 from the output of the interpolators 38, 40 to give a measure of the 'error' between the actual output of each coding path and the ideal output of the 40 msec coding path in the absence of motion compensation and sub-sampling. The error signals output from the error measurers 42, 44 are the control inputs 36 to the selector 34 on the basis of which signals the selector outputs a luminance signal Y' bandwidth limited in accordance with one of the two control paths. The output Y' of the selector 34 is filtered using a 3.5 MHz low pass Nyquist filter 46 of the type described previously. Thus the frequency band of the luminance signal appears, as shown in FIG. 3, as being limited to 3.5 MHz without any loss of resolution.

The chrominance components U and V are bandwidth reduced in a way which, in principle, is identical to the luminance component Y. In practice, the only difference is the scaling of the vertical and horizontal sampling and folding frequencies. In FIG. 5, the chrominance bandwidth limitation circuitry is shown generally at 48. Further explanation is not necessary.

The U' and V' outputs of bandwidth reducer 48 are each filtered by 1 MHz band pass Nyquist filters 50 and 52 and the Y', U' and V' outputs from the three Nyquist filters 46, 50 and 52 are applied to a conventional PAL encoder 54 where they are encoded for transmission in a manner known per se. The output of the encoder is an enhanced PAL signal shown as HD-PAL. As mentioned previously, the U' and V' chrominance components are modulated onto the 4.43 MHz colour sub-carrier. Thus, the severity of the 1 MHz filtering will ensure that the chrominance components are separated from the luminance component which is contained within a 3.5 MHz bandwidth.

The decoder is illustrated in FIG. 6. In order that the decoder can make the correct decoding decision digital assistance data must be transmitted with the HD-PAL signal via the PAL transmission channel. The data represents information as to which of the coding paths has been used for any one area of the screen, and what motion vectors have been assigned during pre-filtering in the case of the 40 msec coding path.

The digital assistance data may be transmitted in one of many ways. For example, the data could be modulated onto a separate channel carrier or added to unused lines of the field blanking interval as for Teletext. Alternatively, a number of the lines normally forming part of the active picture could be used to carry data. In this case, 36 lines at the top and bottom of each of the two fields could be used, giving an aspect ratio of 16:9 and a measure of compatibility with future HDTV program material. The data signal could be added at a low level to cause minimum visible impairment in the black borders at the top and bottom of the compatible PAL picture. This method would still produce symmetrical horizontal and vertical resolutions since the display line pitch is unchanged. Blanking could be introduced at the receiver to hide the DATV data. If 25 active picture lines were used, a 1M bit per second signal could be carried.

Referring back to FIG. 6, the received HD-PAL signal is converted to Y, U and V components by a 'simple' PAL decoder 60; that is, a PAL decoder which does not use a delay line to separate the U and V components. After separation the individual components are decoded by bandwidth reduction decoders, 62, 64 and 66. These are described in detail in U.S. Pat. No. 4,942,466. The digital assistance data is used to decide whether to select data interpolated according to the filtering structure used in the 40 msec pre-filter or the 20 msec pre-filter. In FIG. 6 the interpolators of luminance decoder 62 are shown at 68 and 70 and the Y selector at 72. The 40 msec interpolator operates according to received motion vector data carried on the digital assistance channel.

An output signal presented at the 625/50/2:1 PAL standard would be capable of supporting the maximum definition available from this system, however, its use in a conventional display would give rise to scanning artefacts. The decoder output could be up-converted to different output standards of, for example, 625/50/1:1, 1250/50/2:1 or 1250/100/2:1. Any of these standards could display the output standard adequately.

Display up-conversion would, in practice, best be carried out as part of the decoding process.

In the encoder and decoder of FIGS. 7 and 8 the aim is to produce a system which, as well as being compatible with existing PAL and NTSC systems also has a degree of compatibility with future HDTV coding systems such as HD-MAC and MUSE. The transmitted luminance and chrominance components to be decoded should, after modification, be decoded by a normal HD-MAC decoder or MUSE decoder respectively. The necessary modification is described in our co-pending application Ser. No. 386,785 filed.

In the combined HD-MAC and HD-PAL encoder of FIG. 7, the HDTV source, of the same standard as the previous embodiment, is time compressed for each of its Y, U and V components in time compresser 73, 74 and 75. Each of the time compressed components form one input to a respective two position switch 76 (only one of which is shown), the other input of which is the uncompressed HDTV component. A HDTV bandwidth reduction encoder 78 of the type described in U.S. Pat. Nos. 4,942,466 and 4,873,573 bandwidth reduces the output from the switch 76 and produces a 625/50/2:1 standard output. Thus, when switch 76 is in position 'M' in FIG. 6, the bandwidth reducer is used to feed a high definition MAC channel and the reducer 78 accepts a 1250 line interlaced or sequential source picture and delivers a bandwidth reduced version packaged as a 625 line interlaced signal suitable for normal MAC encoding. In position 'P' of switch 76 the input signals are then sample rate changed and compressed in time at the input to the bandwidth reducer and expanded at the output in expansion units 80, 82 84. This operation is described in more detail in our co-pending application Ser. No. 386,785. The effect of this operation is to move the horizontal folding frequency used within the HDTV bandwidth reducer to the frequency required for clean PAL encoding as shown in FIG. 3, with the luminance and chrominance signals separated. The time expanded components are filtered through Nyquist filters 86, 88 and 90 as in the previous embodiment and fed to a PAL encoder 92 for transmission via a standard PAL channel. When position M is selected for switch 76 and the corresponding selection switch 94 on the output side of the bandwidth reducer 78, the bandwidth reduced signal is fed directly to an HD-MAC encoder 96 in 625/50/2:1 format for transmission via a MAC channel.

The decoder shown in FIG. 8 is the inverse of the encoder in order to allow an HDTV decoder and display to be used for decoding and displaying HD-PAL. If the HDTV coding system is non-compatible, such as the MUSE system described in the NHK laboratory note No. 304 by Ninomiya et al. some form of sample reordering will be necessary to make NTSC encoding possible. A suitable system is described in our U.S. Pat. No. 4,884,138.

The embodiment of FIGS. 7 and 8 has the advantage that, in the event of a substantial market penetration by an HDTV based bandwidth reduction system, the same receiver hardware can be used, at least in part, to decode HD-PAL. The compatibility of such a system, that is the picture quality produced by the normal PAL decoder, is likely to be poorer than that available from a bandwidth reduction system specifically designed for a PAL only environment, since there is likely to be sample interleaving for transmission and a four-fold spectrum folding.

We claim:

1. A method of encoding a colour video signal comprising, separating the luminance Y and chrominance U, V components of a video signal source, compressing the bandwidth of each of the separated Y, U and V components by two or more different methods, selecting in response to a control signal indicative of and responsive to picture content, one set of the bandwidth compressed components compressed by one of the methods, filtering the selected luminance and chrominance components individually with a respective bandpass filter and encoding the components for transmission via a conventional transmission channel whereby the bandpass filter luminance and chrominance signals occupy substantially mutually exclusive areas of the frequency spectrum.

2. A method according to claim 1, wherein the bandwidth compressed luminance signal is filtered by a low pass filter and each of the chrominance signals are filtered by a further low pass filter, the filtered chrominance signals being modulated onto a colour sub-carrier by the encoder to achieve separation from the luminance signal.

3. A method according to claim 1, wherein the control signal is inserted into the vertical blanking interval of the transmitted video signal.

4. A method of transmitting a television signal, comprising the steps of generating a video signal, generating from the video signal a digital assistance signal comprising a plurality of items of data, each encoded in accordance with claim 1 and each representing picture-dependent information from a related respective area of the picture carried by the video signal, and inserting the digital assistance signal into a plurality of active picture lines of the video signal, which lines carry no picture information.

5. A method according to claim 1, in which the video signal source is at a higher line standard than the transmitted signal and each bandwidth compression method comprises filtering the higher line standard signal, sub-sampling the filtered transmission line standard signal and converting the filtered and sub-sampled signal to the transmission line standard.

6. A method according to claim 5, wherein the samples are re-ordered after sub-sampling during conversion to the transmission line standard.

7. A conventional television signal, modified in that a plurality of active picture lines are replaced by items of additional data each encoded in accordance with claim 1 and each representing picture-dependent information from a related respective area of the picture being transmitted.

8. A signal according to claim 7, wherein up to 36 lines at each of the top and the bottom of each field carry items of additional data instead of picture information.

9. A method according to claim 1, wherein the control signal is carried as digital assistance data on a plurality of active picture lines not used to carry picture information.

10. A method according to claim 9, wherein the control signal is added to the video signal at low level.

11. A method according to claim 9, wherein up to 36 lines at each of the top and the bottom of each field are used to carry the control signal.

12. A method according to claim 13, wherein the aspect ratio of the encoded picture is approximately 16:9.

13. A method according to claim 1, in which the different methods of bandwidth compression comprise filtering with a three dimensional pre-filter and a two-dimensional pre-filter.

14. A method according to claim 13, wherein the two-dimensional filter is a horizontal-vertical filter.

15. A method according to claim 13, in which the source signal is additionally filtered by a three-dimensional non-motion compensated reference filter.

16. A method according to claim 13, wherein the three-dimensional filter is a motion compensated filter.

17. A method according to claim 16, wherein the control signal additionally generates motion vectors and assigns the vectors to moving scene content such that the three-dimensional filter compensates for displacements between fields.

18. A method according to claims 11, 10 or 11, wherein blanking is applied to the portion of the video signal carrying the control signal.

19. A method of decoding a video signal encoded according to claims 1, 5, 6, 13, 14, 16, 17, 15, 2, 3, 9, 10, 11, or 12, comprising receiving a transmitted compressed video signal in which the luminance and chrominance components occupy substantially mutually exclusive areas of the frequency spectrum of the received signal and the bandwith compression has been achieved selectively by two or more methods, reconstituting a signal for display from the received signal by two or more methods means for extracting a control signal transmitted with the video signal from the received video signal, means for selecting the required one of the reconstituting methods to reconstitute the signal for display and means for displaying the reconstituted signal.

20. An encoder for encoding a colour video signal comprising, means for separating the luminance and chrominance components of a video signal source, bandwidth compression means for compressing the bandwidth of each of the separated Y, U and V components of the video signal by two or more different methods, means for selecting between the different compressed signals in response to a control signal indicative and responsive to picture content, means for generating the control signal, band-pass filter means for each of the selected bandwidth compressed Y, U and V components and encoding means for encoding the band-pass filtered luminance and chrominance components for transmission via a conventional television channel, the bandpass filter being chosen and the encoding being such that the luminance and chrominance signal occupy substantially mutually exclusive areas of the frequecy spectrum of the signal to be transmitted.

21. An encoder according to claim 20, wherein the bandwidth compression means comprises means for filtering the components of the video signal source and for sub-sampling the filtered signal and means for converting the sub-sampled and filtered signal to a format compatible with transmission via the conventional transmission channel.

22. An encoder according to claim 20, wherein the bandpass filters for the individual components of the bandwidth compressed video signal comprise a 3.5 MHz low pass filter for the luminance component and a 1 MHz low pass filter for each of the chrominance components and the encoding means comprises means for modulating the chrominance components onto a sub-carrier to achieve separation from the luminance components.

23. An encoder according to claim 20, comprising means for inserting the control data generated by the control data generation means into the vertical blanking interval of the signal to be transmitted.

24. An encoder according to claims 20, comprising means for inserting the control data generated by the control data generation means onto a pluralility of active lines of the signal to be transmitted, which lines carry no picture information.

25. An encoder according to claim 24, wherein the insertion means insert the control data at a low level.

26. An encoder according to claim 20, wherein the bandwidth compression means comprises a three-dimensional pre-filter and a two dimensional pre-filter, the selection means selecting between the filtered output of the two pre-filters.

27. An encoder according to claim 26, wherein the two-dimensional pre-filter is a spatial filter.

28. An encoder according to claim 26, wherein the three dimensional filter is motion compensated.

29. An encoder according to claim 28, wherein the encoder includes a motion vector derivation means arranged to assign motion vectors to moving scene content such that the three dimensional filter compensates for movement between fields.

30. An encoder according to claim 28, comprising a further three-dimensional non-motion compensated reference filter. The selection means selecting the signal filtered by the motion compensated three-dimensional filter or the two dimensional filter in dependence on a measure of the relative difference between the outputs of the non-motion compensated filter and the three dimensional motion compensated filter.

31. Apparatus for decoding a video signal encoded by apparatus according to claims 16, 21, 26, 27, 28, 29, 30, 22, 24, 24, or 25, comprising means for receiving a transmitted bandwidth compressed video signal in which the luminance and chrominance components occupy substantially mutually exclusive areas of the frequency spectrum of the received signal and the bandwidth compression has been achieved selectively by two or more methods, means for reconstituting a signal for display from the received signal by two or more methods, means for extacting a control signal transmitted with the video signal from the received signal, means for selecting the required one of the reconstituting methods to reconstitute the signal for display, and means for displaying the reconstituted signal.

* * * * *

UNITED STATES PATENT AND TRADEMARK OFFICE
CERTIFICATE OF CORRECTION

PATENT NO. : 5,053,857
DATED : October 1, 1991
INVENTOR(S) : Charles Peter Sandbank et al It is certified that error appears in the above-identified patent and that said Letters Patent is hereby corrected as shown below:

Column 10, line 23, Claim 12, "claim 13" should be "claim 11"

Column 10, line 42, Claim 18, "claim 11, 10 or 11" should be

"claim 9, 10, 11"

Column 12, lines 24 and 25, Claim 31, "claims 16, 21, 26, 27, 28, 29, 30, 22, 24, 24, or 25" should be "claims 20, 21, 26, 27, 28, 29, 30, 22, 23, 24, or 25"

Column 9, line 38, Claim 1, "filter" should be "filtered"

Column 11, line 8, Claim 20, "frequecy" should be "frequency"

Column 11, line 24, "pluralility" should be "plurality"

Signed and Sealed this

Twelfth Day of July, 1994

Attest:

BRUCE LEHMAN

Attesting Officer

Commissioner of Patents and Trademarks